June 9, 1953

N. M. NAYMIK 2,641,752

SPOTLIGHT AND FLARE FOR AUTOMOTIVE VEHICLES

Filed Aug. 8, 1952

INVENTOR.
Nicholas M. Naymik
BY
McMorrow, Berman & Davidson
Attorneys.

UNITED STATES PATENT OFFICE 2,641,752

SPOTLIGHT AND FLARE FOR AUTOMOTIVE VEHICLES

Nicholas M. Naymik, Cleveland, Ohio

Application August 8, 1952, Serial No. 303,305

5 Claims. (Cl. 340—321)

This invention relates to utility lights for vehicles, and more particularly, has reference to a combined spotlight and flare, adapted to be placed in circuit with the battery of an automotive vehicle and located within or without the vehicle.

The main object of the present invention is to provide a combined spotlight and flare as described, which can be used in emergency conditions, in the event of motor trouble, light failure, etc., so as to mark the location of the vehicle and thus prevent the vehicle from being struck by other vehicles.

Another object of importance is to provide a device of the type stated which can be usable as a spotlight whenever desired, for the purpose of reading maps at night, checking street signs, and checking the addresses of residences or places of business.

Still another object is to provide a device of the type stated which will be capable of manufacture at a minimum of cost, considering the benefits to be obtained from the use thereof.

Another object is to provide a utility light of the character referred to which will be compact, so as to be capable of storage in a minimum amount of space when not in use.

Still another object is to provide a utility light as stated which will be adapted to be plugged into the cigar lighter socket on the instrument panel of the vehicle.

Yet another object is to provide an improved utility light construction wherein a pair of lamp bulbs are so disposed within a casing as to cause one of said lamp bulbs to form a spotlight, with the other bulb serving as a flare, said bulbs being mounted at opposite ends of a novelly designed socket having movable contacts interposed between the bulbs, with said contacts being spring biased in opposite directions into engagement with the base terminals of the bulbs.

Other objects will appear from the following description, the claims appended thereto, and from the annexed drawing, in which like reference characters designate like parts throughout the several views, and wherein:

Figure 1:
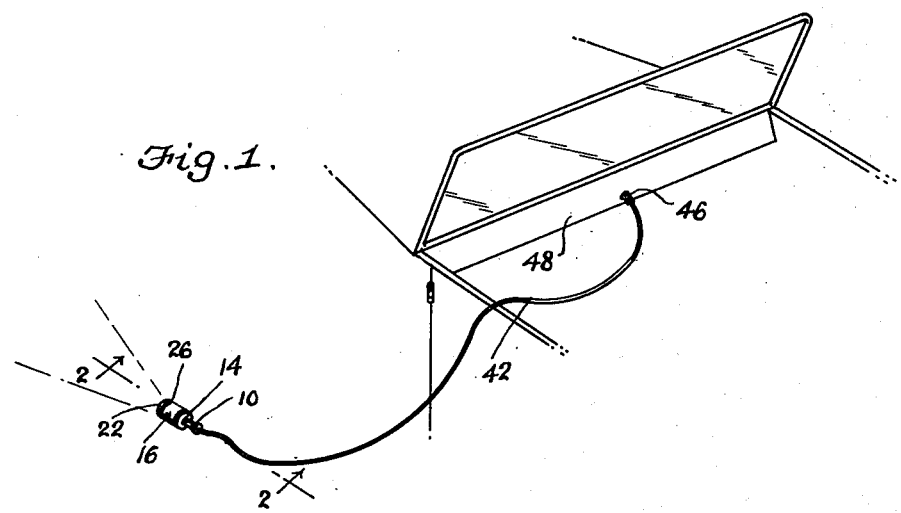
Figure 1 is a perspective view of a utility light formed in accordance with the present invention, an automotive vehicle with which said light is associated being illustrated fragmentarily and in perspective.
Figure 2:
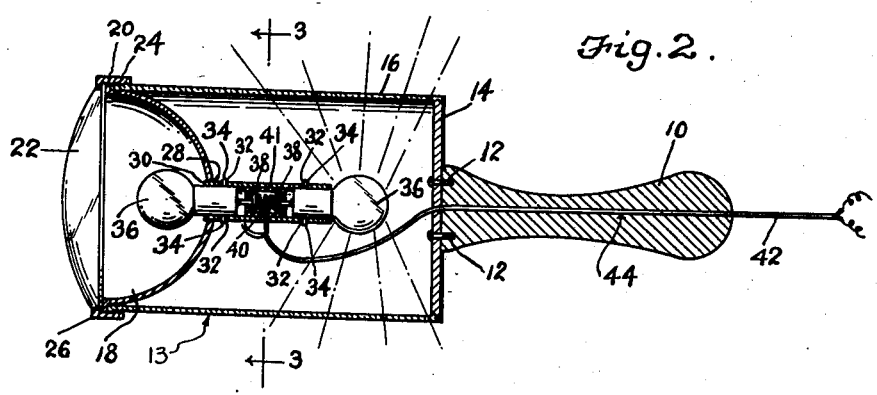
Figure 2 is an enlarged longitudinal sectional view on line 2—2 of Figure 1.
Figure 3:
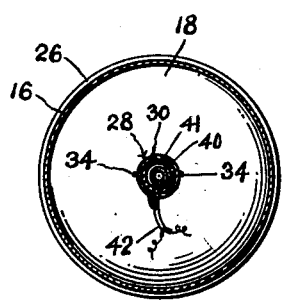
Figure 3 is a transverse sectional view taken substantially on line 3—3 of Figure 2.

The utility lamp which I have devised includes a handle 10 formed of wood or other electrically insulative material, said handle 10 being connected at one end, by screws 12 or equivalent fastening means, to a circular end wall 14 of a hollow casing 13 having a translucent cylindrical side wall 16 detachably connected at one end to the periphery of the end wall.

In that end of the casing remote from the handle 10, I mount a concavo-convex reflector 18, having at its periphery an outwardly extended flange 20 abutting against the adjacent end edge of the cylindrical side wall 16. The periphery of a lens 22 is engaged against the flange 20, and the adjacent end of the casing is provided with external threads 24 receiving the internally threaded clamping ring 26, said clamping ring having an inturned flange engaging against the marginal area of the lens 22. In this way, the lens 22 and the reflector 18 are detachably but fixedly secured to the adjacent end of the casing, the reflector closing said adjacent end.

Formed in the reflector 18 is a center opening 28, receiving one end of a relatively elongated, cylindrical sleeve 30. The sleeve 30 is formed open at both ends, one end of the sleeve opening within the reflector, and the other end of the sleeve opening within the interior of the casing, between the reflector 18 and the end wall 14.

In the opposite end portions of the reflector-supported sleeve 30, I form diametrically opposite bayonet slots 32 receiving the diametrically opposite lugs 34 of lamp bulbs 36. Thus, the lamp bulbs are releasably engaged in the respective ends of the sleeve-like socket 30.

Interposed between the bases of the lamp bulbs 36, intermediate the opposite ends of the socket or sleeve 30, are contacts 38 spaced longitudinally of the sleeve, said contacts being slidable within the sleeve and being adapted, when urged in opposite directions against the base terminals of the lamp bulbs, to permit an electrical circuit to be closed through the lamp bulbs. A spring 40 is interposed between and is held under compression by the contacts 38, and urges said contacts in opposite directions, into engagement with the base terminals of the bulbs.

The contacts 38 and spring 40 are enclosed within a hollow retainer designated generally by the reference numeral 41, said retainer being of insulation material. In this connection, the retainer can comprise a pair of opposed cup-like retainer sections threadedly engaged with one another, said sections having center openings formed in their end walls receiving reduced end portions formed on the contacts 38. The contacts 38 have flanged bases engaging said end walls, thus to limit movement of the contacts outwardly from one another. The retainer 41 can be fixedly mounted within the socket 30 in any suitable manner, and can be frictionally engaged in said socket if desired.

A conductor 42 extends from the socket 30, one lead of said conductor being connected electrically to the spring 40, which spring is of electrically conductive material. The other lead of the conductor is connected electrically to the wall of the socket 30, it being understood that the socket 30 will also be of electrically conductive material and will be engaged with the conductive side wall of each lamp bulb base.

The conductor 42 extends toward the end wall 14, through a longitudinal bore 44 formed in the handle 10, and is preferably formed to a substantial length, having a plug 46 at its free end releasably engageable in the cigar lighter socket of an automotive vehicle having an instrument panel 48.

Thus, it will be seen that when the device is plugged into the cigar lighter socket of the vehicle, both bulbs 36 will be illuminated, and the device can be placed in any location relative to the vehicle. For example, the device can be laid on its side upon the roadway adjacent the vehicle, and when so positioned, will serve as a flare to warn oncoming vehicles. In this connection, the side wall 16 of the casing is formed throughout of a translucent material such as plastic, which translucent material can be colored red if desired.

It will be seen that the device can also serve as a spotlight, since the bulb 36 casts its beams through the lens 22, the reflector and lens co-operating to direct said beams along a predetermined path.

It will be readily observed that the device constituting the present invention can be manufactured at relatively low cost, and can be of small size, so as to be capable of being stored in a relatively small amount of space when not in use. When in use, the device can serve either as a spotlight, or as a warning flare, and additionally can be used as a map light or as a trouble light within the vehicle.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A combined spotlight and flare for automotive vehicles comprising: a casing having a translucent cylindrical side wall; a reflector closing one end of the casing; a bulb mounted in the reflector to cast its beams through said end of the casing; a second bulb mounted in the casing between the reflector and the other end thereof; and means for connecting said bulbs in circuit with the battery of an automotive vehicle.

2. A combined spotlight and flare for automotive vehicles comprising: a casing having a translucent cylindrical side wall; a reflector closing one end of the casing; a cylindrical, open ended socket mounted in the reflector and extending within the casing between the reflector and the other end of the casing; a bulb mounted in one end of the socket within the reflector to cast its beams through said one end of the casing; a second bulb mounted in the other end of the socket to cast its beams through said translucent side wall; and means for connecting said bulbs in circuit with the battery of an automotive vehicle.

3. A combined spotlight and flare for automotive vehicles comprising: a casing having an end wall at one end and a cylindrical, translucent side wall secured at one end to the periphery of said end wall; a concavo-convex reflector engaged peripherally with the other end of the side wall to close the casing at its other end; a cylindrical, open ended socket mounted in the reflector and extending within the casing between the reflector and the other end of the casing; a bulb mounted in one end of the socket within the reflector to cast its beams through said other end of the casing; a second bulb mounted in the other end of the socket to cast its beams through said translucent side wall; and means connecting said bulbs in circuit with the battery of an automotive vehicle.

4. A combined spotlight and flare for automotive vehicles comprising: a casing having an end wall at one end and a cylindrical, translucent side wall secured at one end to the periphery of said end wall; a concavo-convex reflector engaged peripherally with the other end of the side wall to close the casing at its other end; a cylindrical, open ended socket mounted in the reflector and extending within the casing between the reflector and the other end of the casing, said socket having means at its respective ends to releasably engage a pair of lamp bulbs; a bulb engaged in one end of the socket within the reflector to cast its beams through said other end of the casing; a second bulb engaged in the other end of the socket to cast its beams through said translucent side wall; contacts movably mounted in the socket between the bulbs; a spring interposed between the contacts and exerting pressure in opposite directions thereagainst to urge the same against the base terminals of the bulbs; and means for connecting said contacts in circuit with the battery of an automotive vehicle.

5. A combined spotlight and flare for automotive vehicles comprising: a casing having an end wall at one end and a cylindrical, translucent side wall secured at one end to the periphery of said end wall; a concavo-convex reflector engaged peripherally with the other end of the side wall to close the casing at its other end; a cylindrical, open ended, electrically conductive socket mounted in the reflector and extending within the casing between the reflector and the other end of the casing, said socket having means at its respective ends to releasably engage a pair of lamp bulbs; a bulb engaged in one end of the socket within the reflector to cast its beams through said other end of the casing; a second bulb engaged in the other end of the socket to cast its beams through said translucent side wall; contacts movably mounted in the socket between the bulbs; an electrically conductive spring interposed between the contacts and exerting pressure in opposite directions thereagainst to urge the same against the base terminals of the bulbs; a retainer of electrically insulative material disposed in said socket and enclosing said contacts and spring; and leads extending from the spring and from said socket respectively to provide means for connecting the bulbs in circuit with the battery of an automotive vehicle.

NICHOLAS M. NAYMIK.

References Cited in the file of this patent

UNITED STATES PATENTS

| Number | Name | Date |
|---|---|---|
| 1,395,490 | Graff | Nov. 1, 1921 |
| 1,510,188 | Mattke | Sept. 30, 1924 |
| 1,568,361 | Blanchfield | Sept. 30, 1924 |
| 1,977,356 | Schmid | Oct. 16, 1934 |